United States Patent
Wheeler (10) Patent No.: US 7,516,482 B2
(45) Date of Patent: Apr. 7, 2009

(54) SECURE HIERARCHICAL NAMESPACES IN PEER-TO-PEER NETWORKS

(75) Inventor: Graham A. Wheeler, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 834 days.

(21) Appl. No.: 10/623,994

(22) Filed: Jul. 21, 2003

(65) Prior Publication Data

US 2005/0039045 A1    Feb. 17, 2005

(51) Int. Cl.
    *G06F 15/16* (2006.01)
(52) U.S. Cl. ............ 726/4; 726/5; 726/6; 726/18; 713/155; 713/158; 713/189; 713/190; 380/277; 380/285
(58) Field of Classification Search ......... 713/155–159, 713/189, 190; 726/4, 5, 18, 6; 709/203, 709/245, 226, 235, 238; 380/277, 285; 707/10
    See application file for complete search history.

(56) References Cited

U.S. PATENT DOCUMENTS

| 6,381,627 | B1 | 4/2002 | Kwan et al. | |
|---|---|---|---|---|
| 2003/0056093 | A1 | 3/2003 | Huitema et al. | |
| 2003/0056094 | A1* | 3/2003 | Huitema et al. | 713/157 |
| 2003/0070070 | A1* | 4/2003 | Yeager et al. | 713/157 |
| 2003/0204742 | A1 | 10/2003 | Gupta et al. | |
| 2004/0064721 | A1 | 4/2004 | Murching et al. | |

FOREIGN PATENT DOCUMENTS

| DE | 10143754 A | 4/2003 |
|---|---|---|
| EP | 1220173 A | 7/2002 |
| EP | 1248441 A | 10/2002 |
| EP | 1253766 A | 10/2002 |

OTHER PUBLICATIONS

Marcus Bergner, Improving Performance Of Modern Peer-To-Peer Services, 10th Jun. 2003.
Sameer Ajmani, Steven Richman, and Chuang-Hue Moh, *ConChord: Cooperative Support for Secure Name Resolution*, MIT Laboratory for Computer Science, Mar. 2002, pp. 151, 152.
Sameer Ajmani, Dwaine E. Clarke, Chuang-Hue Moh, Steven Richman, *ConChord: Cooperative SDSI Certificate Storage and Name Resolution*, MIT Laboratory for Computer Science, undated, pp. 1-6.

* cited by examiner

*Primary Examiner*—Kimyen Vu
*Assistant Examiner*—Baotran N To
(74) *Attorney, Agent, or Firm*—Marshall, Gerstein & Borun LLP (57) ABSTRACT

A method and data structure are provided that enables name resolution via a hierarchical or chained lookup of delegated authorities independent of requiring IP addresses of the delegated authorities. In an embodiment, the method provides for lookups by first generating cryptographic keys associated with a namespace. An authority is created using one of the cryptographic keys. Next, the method provides for enabling namespaces to refer to the authority via requesting authorities associated with the namespaces to issue a peer-to-peer type resolution so that names of the namespaces resolve to the authority. For other desired namespaces, the method provides for issuing a resolution that names the authority and names associated with the other namespaces to resolve to the other authorities. For services, the authority and a service name are published to receive and end result such as arbitrary data, an IP address, a protocol name or a port.

18 Claims, 4 Drawing Sheets

SECURE HIERARCHICAL NAMESPACES IN PEER-TO-PEER NETWORKS

FIELD OF THE INVENTION

This invention relates generally to computer systems and, more particularly, relates to security and mapping features for directory services.

BACKGROUND OF THE INVENTION

Peer-to-peer networking refers to using personal computers for more than just client-based computing tasks. More specifically, peer-to-peer computing leverages the fact that modern personal computers have fast processors, vast memories, and large hard drives, none of which are being fully utilized when performing common computing tasks such as e-mail and Web browsing. When a personal computer acts as both a client and server it is acting as a "peer".

The typical computing model for many applications is a client/server model. A server computer typically has vast resources and responds to requests for resources and data from client computers. Client computers initiate requests for resources or data from server computers. A good example of the client/server model of computing is Web browsing. Web servers on the Internet are typically high-end dedicated server computers with very fast processors (or multiple processors) and huge hard disk arrays. The Web server stores all of the content associated with a Web site (HTML files, graphics, audio and video files, etc.) and listens for incoming requests to view the information on a particular Web page. When a page is requested, the Web server sends the page and its associated files to the requesting client.

A point of contrast between client/server and peer-to-peer networking is the use of the Domain Name Service (DNS). Server computers are typically registered in DNS so that client computers can resolve a name to the Internet protocol address of the server computer. Client computers are typically not registered in DNS because many client computers have transient connectivity and connect for unpredictable amounts of time and can be assigned a new Internet protocol address for each connection. Also, client computers do not have shared resources and do not respond to requests for resources. Therefore, other computers do not need to resolve the names of client computers. DNS address records for client computers are not necessary.

Peer computers, on the other hand, have resources to share. However, they still have transient connectivity. Peer computers could use DNS dynamic update to register their names, however, very few DNS servers on the Internet support DNS dynamic update. To be successful for peer-to-peer networking, peer computers do not rely on the existing DNS infrastructure. Therefore, to resolve peer names to their addresses and not rely on DNS, a mechanism referred to as Peer Name Resolution Protocol (PNRP) can be used or other peer-to-peer name resolution protocols, such as P-GRID.

There are problems with both peer-to-peer name resolution protocols and DNS. For example, DNS has high administrative costs when namespaces change; and peer-to-peer name resolution protocols are limited to resolving peer names to IP addresses, protocol names and port identification. What is needed is a method for name resolution and mapping of names that provides enhanced results with lower administrative costs.

BRIEF SUMMARY OF THE INVENTION

Accordingly the invention provides a method of performing lookups that allows peer names to be resolved to arbitrary pieces of data and provide a secure alternative to DNS. The method further supports multiple namespace roots. In one embodiment, the method enabling lookups by first generating one or more cryptographic keys associated with a namespace. Then, the method provides for creating an authority using one of the cryptographic keys. Next, the method provides for enabling one or more namespaces to refer to the authority via requesting authorities associated with the one or more namespaces to issue a peer-to-peer type resolution so that names of the namespaces resolve to the authority. For any other namespaces to which communication is desired, the method provides for issuing a resolution that names the authority and one or more names associated with the other namespaces to resolve to one or more of the other authorities. The method also provides for providing services by publishing the authority and a service name to receive an IP address, a protocol name and a port.

Another method according to an embodiment is directed to implementing a service over the Internet. The method includes generating one or more keys for the service to provide an authority. Next, requesting an administrator of a top level domain to publish a resolution to the service. Next delegating the authority to a subgroup of the service; and publishing the service over the Internet. The publishing the service includes publishing a resolution that identifies a port number, protocol name and IP address for the service.

Another embodiment is directed to a method for operating a name resolution service that includes resolving an authority and name combination to a second authority; and resolving the second authority to a further authority or to an end result such as arbitrary data, a port, protocol name, or an IP address. Thus, the name resolution includes a hierarchical or chained lookup of delegated authorities independent of requiring IP addresses of the delegated authorities.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, can be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
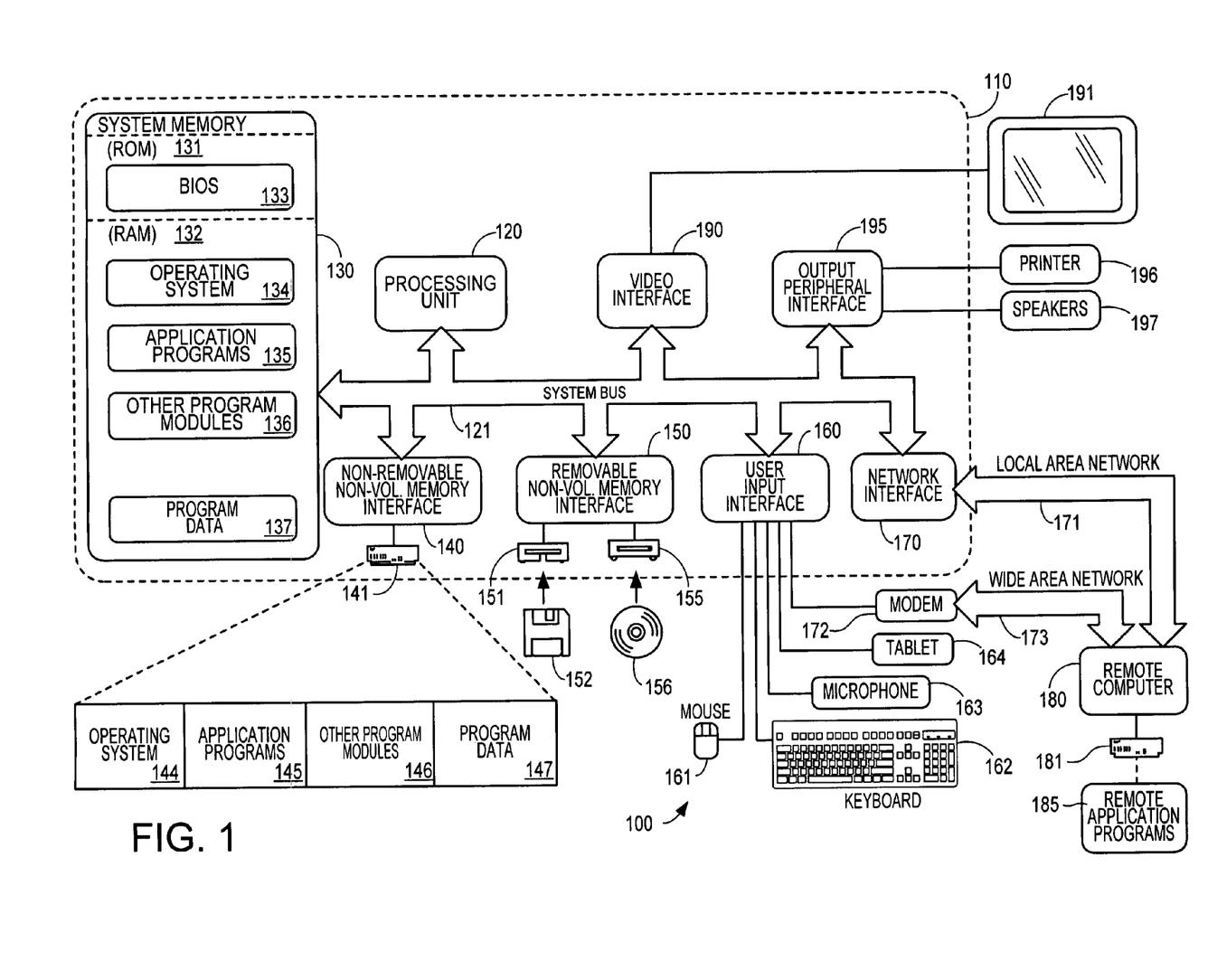
FIG. 1 is a block diagram generally illustrating an exemplary computer system on which the present invention resides.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
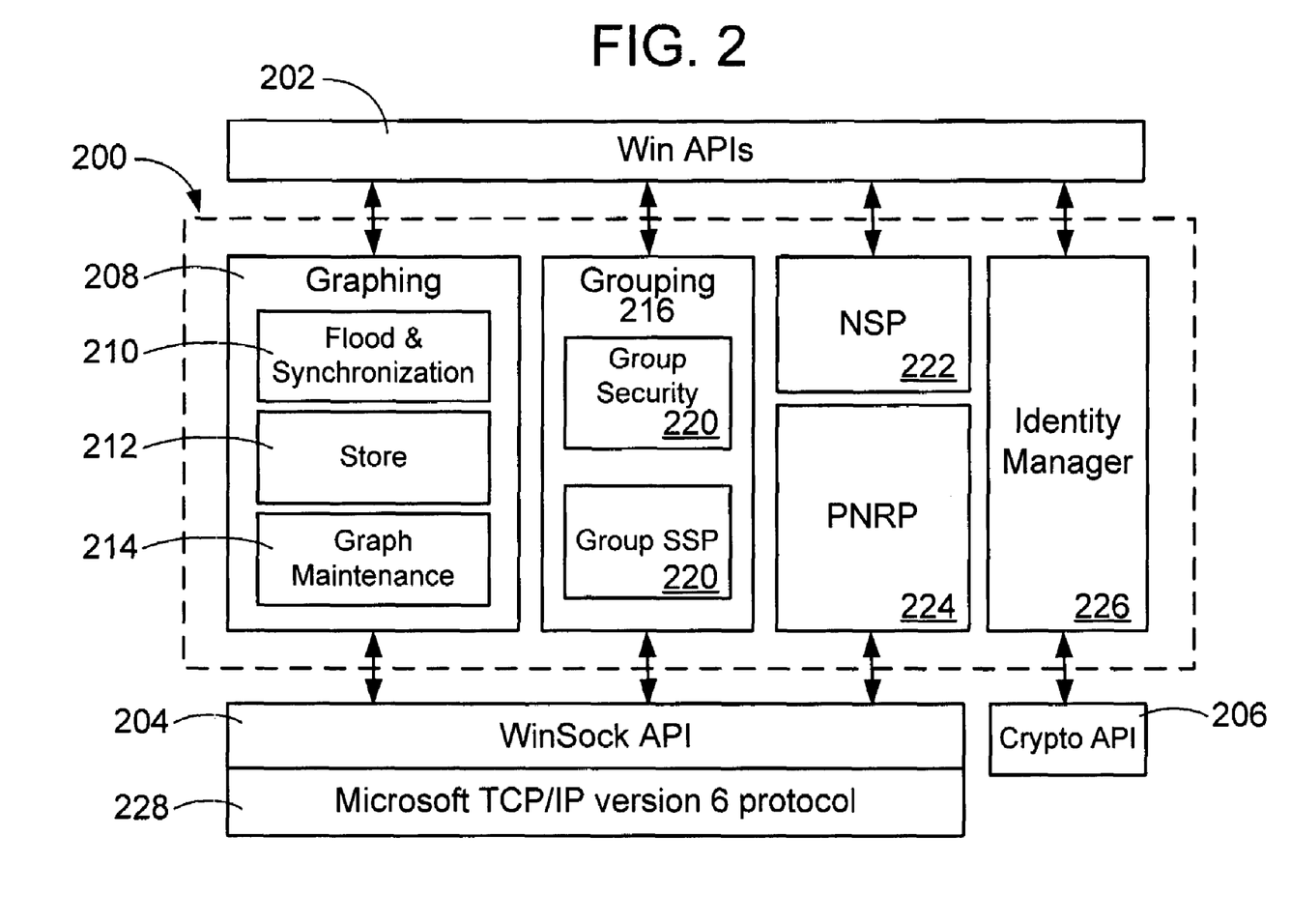
FIG. 2 is block diagram of a system in accordance with an embodiment of the present invention.

Referring to FIG. 2, a block diagram illustrates a peer-to-peer networking architecture 200. As shown, architecture 200 can be coupled to Win32 application programming interfaces (APIs) 202 and to a WinSock API 204 and to an API that provides cryptographic support 206. Architecture 200 includes a graphing component 208 that is responsible for maintaining a set of connected nodes known as a graph and providing flooding and replication of data across the graph. Graphing component 208 uses flood and synchronization component 210, store component 212, and graph maintenance component 214.

Architecture 200 further includes grouping component 216. Grouping component 216 can be implemented as the security layer provided by default on top of a graph. The security layer defines the security model behind group creation, invitation, and connection to the group. In addition, grouping component 216 can be configured to leverage PNRP as the name resolution protocol and enable multiple applications to share the same graph. Grouping component 216 uses group security 218 and group security service provider (SSP) subcomponents 220.

Architecture 200 further includes name service provider (NSP) component 222. NSP component 222 provides a mechanism to access an arbitrary name service provider. Thus, as will be appreciated by those of skill in the art, references to a particular name service provider are understood to be exemplary. In the case of Windows® Peer-to-Peer Networking, peer-to-peer applications use the NSP interface to access PNRP.

Architecture 200 further includes PNRP component 224, which provides peer-to-peer name resolution; and identity manager 226, which enables the creation and management of peer-to-peer identities.

FIG. 2 is shown including Microsoft TCP/IP version 6 protocol 228. The Microsoft TCP/IP version 6 protocol (IPv6) is exemplary and provides the transport over which Windows® Peer-to-Peer Networking operates.

PNRP component 224 uses a peer-to-peer name resolution protocol that allows peer names to be resolved to IP address, protocol and port. More specifically, to communicate between peers, each peer must be able to discover each other's presence and resolve each other's network locations (addresses, protocols, and ports) from names or other types of identifiers. How peers discover each other and resolve each other's names for communication is complicated by transient connectivity and the lack of address records in DNS.

Peer-to-peer network resolution protocols such as P-Grid and PNRP provide a name resolution and peer discovery scheme that is distributed and serverless for name resolution. PNRP provides, like DNS, the complete list of names stored on computers throughout a cloud. Unlike DNS, there are no servers that provide name resolution. Each peer stores a portion of the list in its cache and can refer to other peers. Central servers are not used to resolve names. However, PNRP is not strictly serverless, as there is a seed node computer that facilitates initialization.

Rather than using a name, such as a fully qualified domain name in DNS, PNRP uses identifiers to identify peer entities. Identifiers are just numbers and, therefore, are not subject to language and trademark or copyright issues. PNRP allows each separate peer computer, user, group, device, service or other type of peer node to have its own peer identifier. The list of identifiers is distributed among the peers using a multi-level cache and referral system that allows name resolution to scale to billions of identifiers, while requiring minimal resources on each node.

PNRP is the protocol used to send messages between peers for name resolution and peer discovery. PNRP uses multiple clouds, in which a cloud is a grouping of computers that use addresses of a specific scope. A scope is an area of the network over which the address is unique. PNRP clouds are based on the address scopes for IPv6 addresses. The clouds can include a global cloud corresponding to the global IPv6 address scope and represents all the computers on the entire IPv6 Internet. There is only a single global cloud. A site-specific cloud corresponds to the site IPv6 address scope and site-local addresses. A site is a portion of an organization network that has defined geographical or topological boundaries. There can be multiple site-specific clouds. A link-local cloud corresponds to the link-local IPv6 address scope and link-local addresses. A link-local cloud is for a specific link, typically the same as the locally attached subnet. There can be multiple link-local clouds.

Peer Names and Peer-to-Peer IDs

A peer name is an endpoint for communication, which can be a computer, a user, a group, a service, or anything else that you want to resolve to an IPv6 address. Peer names can be registered as unsecured or secured. Unsecured names are just text strings that are subject to spoofing, as anyone can register a duplicate unsecured name. Unsecured names are best used in private or otherwise secure networks. Secured names can only be registered by the owner and they are protected with a certificate and a digital signature.

PNRP identifiers can be 256 bits long and include a set of high-order 128 bits, known as the peer-to-peer identifier, and are a hash of a peer name assigned to the endpoint.

The peer name of an endpoint has the following format: Authority.Classifier. For secured names, Authority is the Secure Hash Algorithm (SHA) hash of the public key of the peer name in hexadecimal characters. For unsecured names, the Authority is the single character "0". The Authority is typically base64-encoded binary data. The Authority thus provides a means of making peer names secure. The publisher of a peer name can be challenged to provide proof of ownership of the private key corresponding to the public key upon which the authority is based. In particular, data published in PNRP is typically signed using the authority private key (in the specific case of (address, protocol name, port number) tuples, the published data is called a certified peer address (CPA)).

A Classifier is a string that identifies the application and can be any Unicode string up to 150 characters long.

The low-order 128 bits are used for the service location, which is a generated number that uniquely identifies different instances of the same peer-to-peer identifier in the same cloud.

The 256-bit combination of peer-to-peer identifier and service location allows multiple PNRP identifiers to be registered from a single computer.

For each cloud, each peer node manages a cache of PNRP identifiers that includes both its own registered PNRP identifiers and the entries cached over time. The entire set of PNRP identifiers located on all the peer nodes in a cloud includes a distributed hash table. Further, entries for a given PNRP identifier can be located on multiple peers. Each entry in the PNRP cache contains the PNRP identifier, a CPA, and the IPv6 address of the registering node. The CPA is a self-signed certificate that provides authentication protection for the PNRP identifier and contains application endpoint information (addresses, protocol numbers, and port numbers).

Therefore, the name resolution process consists of resolving a PNRP identifier to a CPA. After the CPA is obtained, communication with desired endpoints can begin. Thus, PNRP provides a method for a node to publish a "<peer name>→<data>" association so that other nodes can search for the peer name and determine the data.

Name Resolution

When a peer wants to resolve a peer name to its address, protocol, and port number, it constructs the peer-to-peer identifier based on the peer name. There are several peer-to-peer resolution protocols in the art, the discussion herein refers to PNRP as an exemplary protocol. One of skill in the art with the benefit of this disclosure, however, will appreciate that other resolution protocols can benefit from the embodiments herein.

The peer examines the entries in its own cache for an entry that matches the peer-to-peer identifier. If found, the peer sends a PNRP Request message to the peer and waits for a response. This behavior ensures that the peer node with which to communicate is active in the cloud. If not found, the peer sends a PNRP Request message to the peer that corresponds to the entry that has a peer-to-peer identifier that most closely matches the peer-to-peer identifier being resolved. The node that receives the PNRP Request message examines its own cache. If found, it forwards the request to the intended node and the intended node sends a response back through the request path. If not found, it sends a PNRP Request message to the peer that corresponds to the entry that has a peer-to-peer identifier that most closely matches the peer-to-peer identifier being resolved, and so on until the correct peer is found. More specifically, a peer knows a range of peer-to-peer identifiers including those ten above and below a range of identifiers and the above explanation and the example below has been simplified for purposes of clarity. The actual number of hops required to navigate through the graph of peers is the log (number space of the peer-to-peer identifiers).

Figure 3:
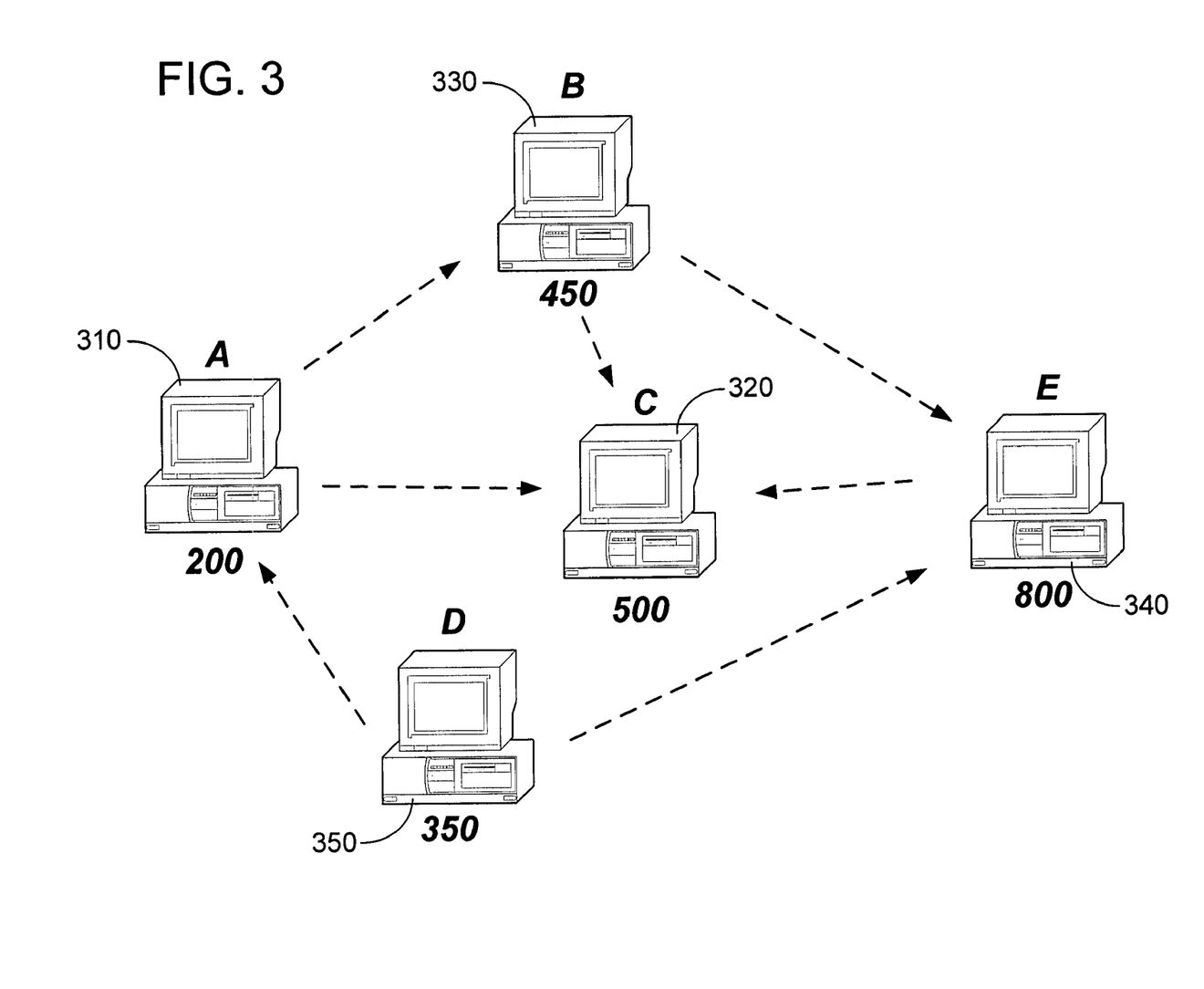
FIG. 3 is a block diagram illustrating a peer-to-peer type resolution.

Referring now to FIG. 3, a set of peer nodes provides an example of name resolution. Peer A 310 has entries for its own PNRP identifier (200) and the PNRP identifier of 450 and 500. An arrow from one node to another means that the node from which the arrow originates has an entry in its cache for the node to which the arrow is pointing.

In the example, assume Peer A 310 wants to resolve the PNRP ID of 800. Peer A 310 sends a PNRP Request message to a node with the closest PNRP ID to 800, which is held by Peer C 320 because 500 is numerically closer to 800 than the other entries held by Peer A 310. As shown, Peer C 320 does not have an entry for the PNRP ID of 800 and does not have any entries that are closer to 800. Peer C 320 sends a response back to Peer A so indicating.

Because 450 is the next numerically closer PNRP ID to 800, Peer A 310 sends a PNRP Request message to node Peer B 330 because it has registered the PNRP ID of 450. Peer B 330 forwards the request to the IP address that registered the PNRP ID of 800, which is Peer E 340. Although Peer B has an entry for Peer E in its cache, the existence of the cache entry does not assure that Peer E is currently available on the network. Thus, Peer E 340 sends a response back to Peer B 330. Peer B 330 then sends a response back to Peer A 310. Peer D 350 with a PNRP ID of 350 does not receive any messages according the name resolution procedure. To prevent loops in the forwarding of PNRP Request messages, each message contains the list of peers that have already forwarded the request. While the PNRP Request message is being forwarded, its contents are used to populate caches of nodes that are forwarding it. When the response is sent back through the return path, its contents are also used to populate node caches.

A problem with PNRP is that to communicate with a peer the authority must be known for the peer. The authority is a large number for which there is no resolution protocol to avoid having to communicate the authority to other peers with which a peer wishes to communicate. The responses are secure because they are tied to an RSA key and can be proven secure. PNRP also provides that authority.name can provide an IP address and is limited to locating ports.

The above example illustrates how PNRP maps peer names for peer nodes. Embodiments herein provide a system and method for generalizing PNRP to support the mapping of peer names to arbitrary pieces of data. Embodiments described herein leverage the ability of PNRP mapping to provide a secure alternative to the domain name service (DNS). In DNS, the top-level domains (TLDs) are administered by The Internet Corporation for Assigned Names and Numbers (ICANN). The Internet's DNS allows users to refer to web sites and other resources using easier-to-remember domain names (such as "www.icann.org") rather than the all-numeric IP addresses (such as "192.0.34.65") assigned to each computer on the Internet. Each domain name is made up of a series of character strings (called "labels") separated by dots. The right-most label in a domain name is referred to as its "top-level domain" (TLD).

The DNS forms a tree-like hierarchy. Each TLD includes many second-level domains (such as "ICANN" which can be found at "www.icann.org"); each second-level domain can include a number of third-level domains ("www" in "www.icann.org"), and so on.

The responsibility for operating each TLD (including maintaining a registry of the second-level domains within the TLD) is delegated to a particular organization. These organizations are referred to as "registry operators", "sponsors", or simply "delegees."

DNS provides a root name service including services for .com, .info, .net, .gov and the like. For example, a request for www.microsoft.com will first locate "com" and the request is forwarded to one of several servers responsible for "com". Those servers will then search for the address associated with "microsoft". The server responsible for microsoft.com then provides the address for "www" part of www.microsoft.com. A problem with DNS is that creating your own names in the "microsoft.com" space is not feasible. Additionally, to change a name, system administrators must run the addresses and inform servers via propagation through several machines which is untimely.

Simple Public Key Infrastructure (SPKI) is a system that provides that only device that can authoritatively speak for my keys is the creator of the keys. That leaves it up to other devices to decide whether to trust a device. For example, a device can provide that key pair such as (myname,mypublickey)$_{privatekey}$, the subscript identifying that the name and key are signed. The device can also sign a certificate using keys known of others: (myname, yourname,yourpublickey, mypublickey)$_{myprivatekey}$. The other device can also issue a certificate for its own key: (yourname, yourpublickey)$_{yourprivatekey}$. Thus, if a device wants to retrieve your public key and the device trusts the device publishing the key, the device does not have to retrieve the key directly from the owner of the key.

In SPKI, if a user wants to find out a key, another certificate with the key can be queried to prove identity and provide a way of contacting the owner of the key, which can also be queried. SPKI generally provides that providing a public key and a name can provide a key, with SPKI allowing a hierarchical structure to locate a desired key.

For purposes of the present disclosure, the notation [ ] will be used to represent an authority. { }$_{[auth]}$ will be used to represent signing with the authority private key. Embodiments herein are directed to a name service that supports multiple namespace roots by providing that a name and an authority can produce a second authority: ([auth],name)→(auth$_2$) without specifying an IP address. If an IP address is required, the results of a lookup can be used for another lookup until an IP address is provided as a result.

Figure 4:
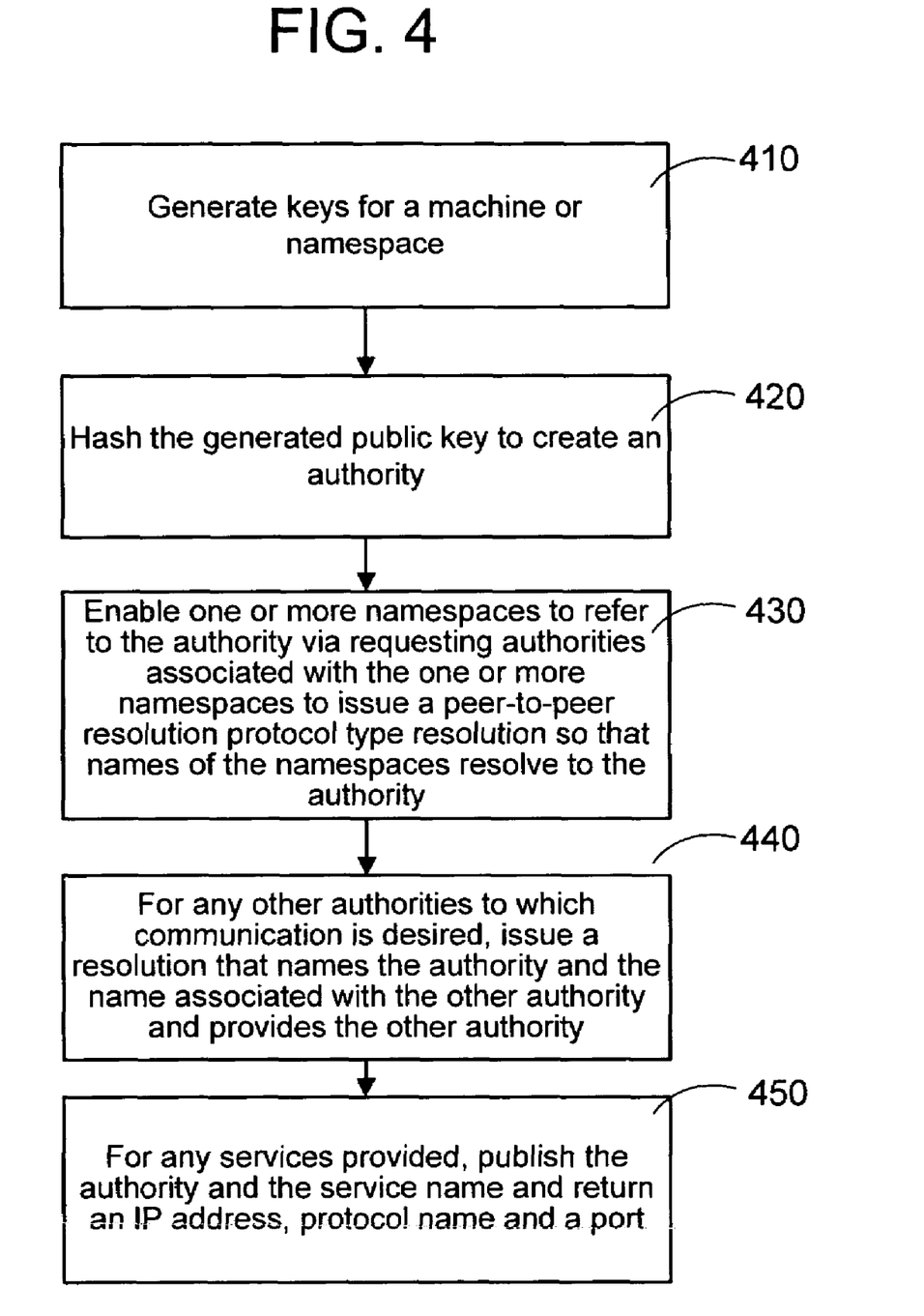
FIG. 4 is a flow diagram illustrating a method in accordance with an embodiment of the present invention.

Referring to FIG. 4, a flow diagram illustrates a method according to an embodiment. Block 410 provides for generating keys for a machine or namespace. The keys can be SPKI type keys such that the authentication is provided using self-signed certificates, some of which can be formatted as X.509 certificates. Block 420 provides for hashing the generated public key to create an authority [A]. Any verifiable collision-resistant reducing transformation of a public key could be used or an actual public key could be used for systems for which size is irrelevant.

Block 430 provides for enabling one or more namespaces to refer to the authority via requesting authorities associated with the one or more namespaces to issue a peer-to-peer type resolution so that the names of the namespaces resolve to the authority. Thus, if there are other namespaces $S_1, S_2, \ldots S_N$ with names $N_1, N_2 \ldots N_N$ for which communication and referencing to the authority is desired, request authorities for those namespaces to issue using a peer to peer name resolution protocol such as PNRP: ([$S_1$].$N_1$)→A, ([$S_2$].$N_2$)→A ... ([$S_N$].$N_N$)→A so that the names $N_1, N_2$ can resolve to A (the authority). Block 440 provides, for any other authorities to which communication is desired, issue a resolution that names the authority and the name associated with the other authority and provides the other authority. Thus, for any other authorities $A_1, A_2 \ldots A_N$ with namespaces $N_1, N_2 \ldots N_N$ to which communication is desired, issuing a resolution to ([A].$N_1$)→$A_1$; ([A].$N_2$)→$A_2$ ... ([A].$N_N$)→$A_N$. Block 450 provides that, for any services provided, publish the authority and the service name and return an end result of one or more of an IP address, protocol name and a port. Thus, for any services provided, publish ([A].servicename)→(IPaddress, protocol name, port).

The services can also be resolved to provide any arbitrary data as desired. For example, a computer can use embodiments described herein to track inventory for different sets of items. According to an embodiment, the items can be located via a hierarchical namespace. In one example, the hierarchy can be organized with a top level company. The next level could be a warehouse within the company. Each warehouse could support a level identifying part names. A part name level could support an inventory level and a price level and the like. Each of the inventory level and price level could resolve to identify stock on hand. Instead of providing a port name, protocol and IP address, according to the embodiment, the query would resolve to an end result such as to provide data regarding availability, for example. In one embodiment, the end result can be a query for which company provides the lowest price and has available product, in which case, the end result could be the originating company.

In one embodiment, the authorities used to locate an IP address, port and protocol name can be retrieved from cache in a peer-to-peer network. If an IP address, port and protocol name are retrieved from cache, however, further resolutions would be required to reach the owner to make the challenge.

Following a method in accordance with an embodiment, a service can generate keys for the service to provide an authority, such as authority=hash(public key for service). Next, the service can request that the authorities for ICANN.com or another administrator for a TLD to publish ([com], Service)→hash(public key for Service). Next, according to the method, the service delegates authority to a namespace, such as subgroup: ([Service], subgroup)→hash(public key for subgroup). Next, the method provides for publishing a web service: ([Service].www)→(IPaddress, TCP, 80).

Thus, to implement the method using ICANN and use the method to provide a domain name service, ICANN can have a public/private key pair and use the public key to derive an authority [ICANN]. ICANN can then provide that administrators of each of the TLDs generate a key pair, and associated authority ([com], [edu], [org], etc). ICANN then published a binding for each TLD:

{[ICANN].com→[com]}$_{[ICANN]}$
{[ICANN].edu→[edu]}$_{[ICANN]}$
{[ICANN].org→[org]}$_{[ICANN]}$ In another example, Microsoft® creates a key pair, and provides the authority [Microsoft] to the administrator of the corn domain. That administrator then publishes:

{[com].microsoft→{Microsoft]}$_{[com]}$

The Microsoft administrator can in turn publish CPAs for externally visible Microsoft® services instead of hosts: {[Microsoft].www→(address,TCP,80)}$_{[Microsoft]}$ Thus, the method provides ports and protocol information and not just addresses. By enabling resolving to services, the method is more useful than those lookup methods that resolve only to hosts, such as DNS. Note that [ICANN] is just one possible root authority and others can be easily created. Local namespaces can be set up, that operate in different address scopes.

The method provided has advantages over a DNS-type lookup. For example, the method uses signed names providing added security over DNS.

The method also has advantages over typical peer-to-peer name resolution protocols such as PNRP. As described earlier, PNRP can be implemented via a global PNRP cloud. If all publishers participate in a global PNRP cloud, there is no need to have primary/secondary name server records, with the attendant administrative burden when these change and higher level domain administrators must update their configurations and changes to DNS caches must propagate. A lookup performed according to the method provided herein results in eased administrator duties. The only time an "upstream" administrator needs to change a record is when someone creates a new key pair and retires the old authority, which should only happen in the event of serious security breaches.

Additionally, unlike prior lookup methods, dynamic addresses can be trivially supported, simply by delegating authority further by creating new authorities. For example, if a Microsoft® web server used a dynamic host control protocol (DHCP)-assigned address, then the server could also have a key pair. The key pair enables the server to generate the authority [www], and the Microsoft® administrator could publish: {[Microsoft].www→[www]}$_{[Microsoft]}$ without having to update actual IP addresses.

Whenever the web server is assigned a new address, it publishes:

{[www].→(address,TCP,80)}$_{[www]}$

Thus, the method provides a dynamic DNS-type lookup wherein each host can update details freely without having to update a central server. In one embodiment of the method the dynamic lookup can result in a cyclical chain of authorities in which the final authority and a first authority are the same. For example, a first vendor of other service can provide an authority in response to a query wherein the authority is associated with a service that operates to provide a lookup for vendors with predetermined qualities. If the first vendor has one or more of the predetermined qualities, the authority returns includes the authority for the first vendor in response to the query.

In view of the many possible embodiments to which the principles of this invention can be applied, it will be recognized that the embodiment described herein with respect to the drawing figures is meant to be illustrative only and are not be taken as limiting the scope of invention. For example, those of skill in the art will recognize that the elements of the illustrated embodiment shown in software can be implemented in hardware and vice versa or that the illustrated embodiment can be modified in arrangement and detail without departing from the spirit of the invention. Therefore, the invention as described herein contemplates all such embodiments as can come within the scope of the following claims and equivalents thereof.

I claim:

1. A method of using a peer-to-peer type resolution to enable a secured, centralized hierarchical lookup between connected devices, the method comprising:
   generating one or more first cryptographic keys associated with a first namespace of a first domain, the first domain being a member of a set of centralized hierarchical domains of namespaces;
   creating a first authority using one of the one or more first cryptographic keys;
   generating one or more next cryptographic keys associated with a next higher-level namespace, the next higher-level namespace at a higher level domain than the first namespace, the higher level domain being another member of the set of centralized hierarchical domains of namespaces;
   creating a next higher-level authority using one of the one or more next cryptographic keys; and
   publishing, using the peer-to-peer type resolution, an association between the first and the next higher-level namespaces, the association comprising:
      a signed resolution that resolves a unique name of the first namespace to the first authority,
      the signed resolution signed with the one of the one or more next cryptographic keys and the unique name including the next higher-level authority and the first namespace.

2. The method of claim 1 wherein the connected devices are part of a peer-to-peer network cloud.

3. The method of claim 1, further comprising: if the first namespace comprises a service, publishing a second association, the second association comprising a signed service resolution that resolves the first authority to an end result that provides data, the signed service resolution signed with the one of the one or more first cryptographic keys.

4. The method of claim 1, further comprising: if the first namespace comprises a service, publishing a second association, the second association comprising a signed service resolution that resolves the first authority to an IP address, a protocol name and a port, the signed service resolution signed with the one of the one or more first cryptographic keys.

5. The method of claim 1 further comprising: supporting a dynamic change of address of the first namespace from an initial to a new address via delegating authority, comprising publishing, using the peer-to-peer type resolution, a new association between the new address and the first namespace, the new association comprising a signed new resolution that resolves the first authority to the new address, the signed new resolution signed with the one of the one or more first cryptographic keys.

6. The method of claim 1 wherein the signed resolution resolves the name to one of the group: a host and a service.

7. The method of claim 1 wherein creating the first authority includes performing a first hash of the one of the one or more first cryptographic keys, the one of the one or more first cryptographic keys being a first public key from a first private key-public key pair, and
wherein creating the next higher-level authority includes performing a next hash of the one of the one or more next cryptographic keys, the one of the one or more next cryptographic keys being a next public key from a next private key-public key pair.

8. A method of generating a data structure for implementing a name resolution protocol, comprising:
generating a first field comprising a first authority component associated with a first public key, the first public key being part of a first private key-public key pair and the first authority component corresponding to a first namespace of a first domain, the first domain a member of a set of centralized, hierarchical namespaces; and
generating a second field comprising a second name component associated with a second namespace, the second namespace corresponding to a second authority and a domain of the second namespace being another member of the set of centralized, hierarchical namespaces and being at a lower level than a domain of the first namespace, wherein the first authority component and the second name component are capable of resolving to the second authority, and
providing the generated data structure to the name resolution protocol for publishing a resolution that resolves the first authority component and the second name component to the second authority.

9. The method of claim 8, further comprising: if the second namespace is a service, providing the second authority component to the name resolution protocol for publishing a second resolution that resolves the second authority to a port number, a protocol name, and an IP address of the service.

10. The method of claim 8, wherein if the first namespace is a first host, the first authority component and the second name component are capable of resolving to a second host corresponding to the second authority.

11. The method of claim 8, further comprising retrieving one or more from the group an IP address, a protocol name, and a port number from a cache.

12. A computer readable storage medium tangibly embodying a program of instruction executable by a computer for performing steps for using a peer-to-peer type resolution to enable a secured, centralized hierarchical lookup between connected devices, the steps comprising:
generating one or more first cryptographic keys associated with a first namespace of a first domain, the first domain being a member of a set of centralized hierarchical domains of namespaces;
creating a first authority using one of the one or more first cryptographic keys;
generating one or more next cryptographic keys associated with a next higher-level namespace, the next higher-level namespace at a higher-level domain than the first namespace, the higher level domain being another member of the set of centralized hierarchical domains of namespaces;
creating a next higher-level authority using one of the one or more next cryptographic keys; and
publishing, using the peer-to-peer type resolution, an association between the first and the next higher-level namespaces, the association comprising:
a signed resolution that resolves a unique name of the first namespace to the first authority,
the signed resolution signed with the one of the one or more next cryptographic keys and the unique name including the next higher-level authority and the first namespace.

13. The computer readable storage medium of claim 12 wherein the connected devices are part of a peer-to-peer network cloud.

14. The computer readable storage medium of claim 12 wherein if the first namespace is a service, publishing a second association, the second association comprising a signed service resolution of the first authority to one or more of: arbitrary data or the group of an IP address, a protocol name and a port, the signed service resolution signed with the one of the one or more first cryptographic keys.

15. The computer readable storage medium of claim 12 wherein the steps further comprise: supporting a dynamic change of address of the first namespace from an initial to a new address via delegating the authority, comprising publishing, using the peer-to-peer type resolution, a new association between the new address and the first namespace, the new association comprising a signed new resolution that resolves the first authority to the new address, the signed new resolution signed with the one of the one or more first cryptographic keys.

16. The computer readable storage medium of claim 12 wherein the signed resolution resolves the name to one of the group: a host and a service.

17. The computer readable storage medium of claim 12 wherein the signed resolution resolves the name to arbitrary data.

18. The computer readable storage medium of claim 12 wherein creating the first authority includes performing a first hash of the one of the one or more first cryptographic keys, the one of the one or more first cryptographic keys being a first public key from a first private key-public key pair, and
wherein creating the next higher-level authority includes performing a next hash of the one of the one or more next cryptographic keys, the one of the one or more next cryptographic keys being a next public key from a next private key-public key pair.

* * * * *